United States Patent [19]
Hunter

[11] 3,800,742
[45] Apr. 2, 1974

[54] APPARATUS USED IN THE TREATMENT OF TIRE CORD FABRIC

[75] Inventor: Edward E. Hunter, Akron, Ohio

[73] Assignee: The Goodyear Tire & Rubber Company, Akron, Ohio

[22] Filed: July 12, 1972

[21] Appl. No.: 270,899

[52] U.S. Cl. ............................... 118/246, 118/249
[51] Int. Cl. .................................... B05c 1/08
[58] Field of Search ....... 118/246, 249, 221; 68/202

[56] References Cited
UNITED STATES PATENTS

| 573,229 | 12/1896 | Metz | 118/246 X |
| 931,492 | 8/1909 | Ross | 118/249 |
| 1,974,734 | 9/1934 | Barber | 118/246 X |
| 2,159,949 | 5/1939 | Hirsch | 118/249 X |
| 3,735,733 | 5/1973 | Henc | 118/221 X |

Primary Examiner—John P. McIntosh
Attorney, Agent, or Firm—F. W. Brunner; H. E. Hummer

[57] ABSTRACT

A dip tank for holding liquid adhesive for increasing the bond between tire cord fabric and rubber material used in the production of pneumatic tires, and a series of rollers for directing tire cord fabric into contact with the liquid adhesive in the dip tank.

8 Claims, 2 Drawing Figures

PATENTED APR 2 1974  3,800,742

APPARATUS USED IN THE TREATMENT OF TIRE CORD FABRIC

BACKGROUND OF THE INVENTION

The invention is well suited for use in the treatment of tire cord fabric, especially in the application of a conventional latex base adhesive used for coating the tire cord fabric to increase the bond between the fabric and rubber material used in the production of tires. At present, tire cord fabric is normally reeved on a roller which rotates in the liquid adhesive in a dip tank. Unfortunately, the roller bearings are also submerged in the liquid adhesive. The seals protecting the bearings are not impregnable and some liquid adhesive seeps into the bearings and eventually ruins them. When this happens, the faulty bearings must be removed and replaced. This is a costly operation because subsequent steps for treating the tire cord fabric are seriously affected by the stoppage. For example, any wet, liquid-coated fabric traveling through an oven for subsequent drying, is generally ruined and must be discarded. Thus, a simple mechanical component becomes critical to the continuous treatment of tire cord fabric. The invention is directed to solving this particular problem by providing what might be termed a bearingless roller or drum used in the application of liquid adhesive to the tire cord fabric.

Briefly stated, the invention is in an apparatus for treating a continuous length element such as tire cord fabric with a liquid coating material. The apparatus comprises a dip tank for holding a liquid coating material and a cylindrical drum which is rotatable in the dip tank and sized and weighted for buoyancy in the liquid coating material. The drum is unrestrained along its longitudinal axis about which the drum rotates and floats in the liquid coating material when the drum is freely disposed in the dip tank. A pair of spaced rollers are provided for holding the drum at least partially submerged in the liquid coating material as the drum rotates. The rollers are rotatable about their longitudinal axes which are parallel to the rotational axis of the drum. Means are supplied between the rollers for engaging the continuous length element and maintaining it clear of the drum between the rollers, such that the element will not exert force against the drum sufficient to move the drum in a direction away from the rollers.

DESCRIPTION OF THE DRAWING

The description of the invention will be better understood by having reference to the annexed drawing, wherein.

DESCRIPTION OF THE INVENTION

Figure 1:
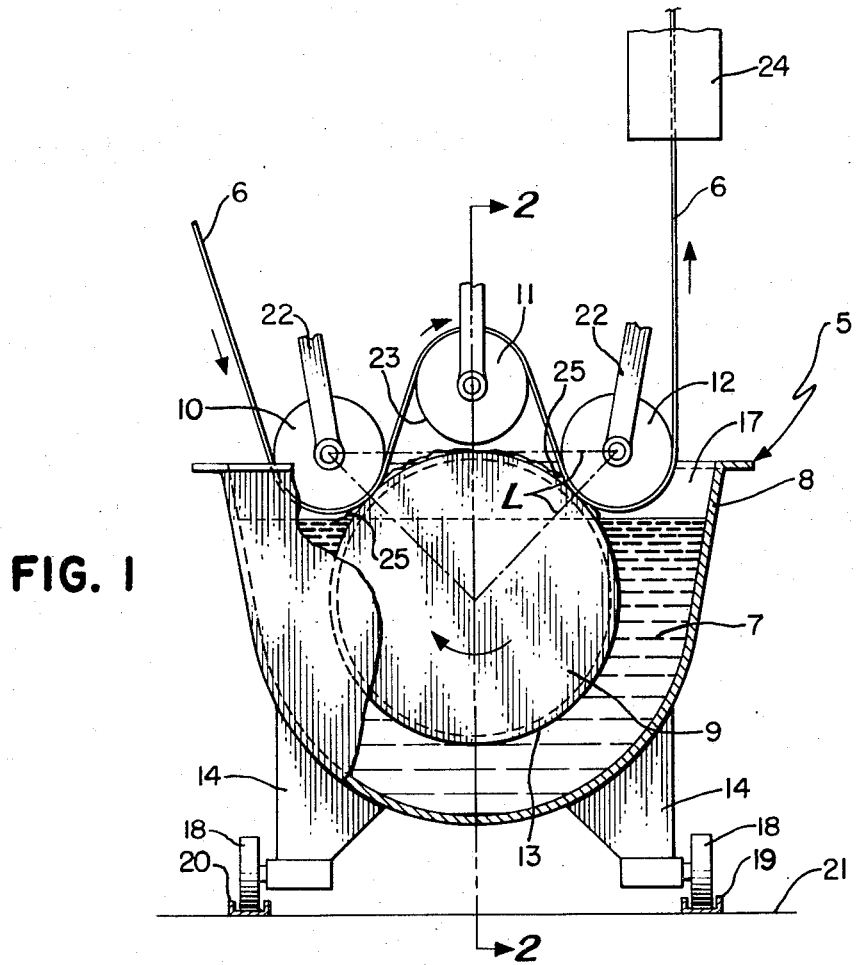
FIG. 1 is a section of an apparatus made in accordance with the invention, as viewed from the line 1—1 of FIG. 2.
Figure 2:
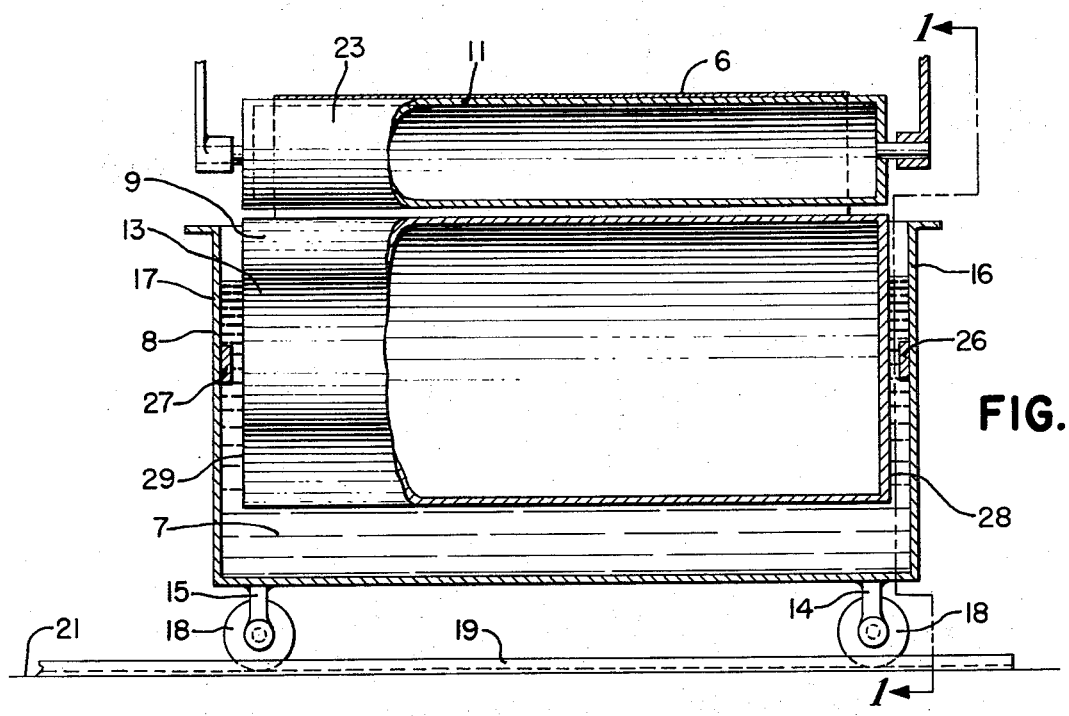
FIG. 2 is a section of the apparatus viewed from the line 2—2 of FIG. 1.

Referring generally to the drawing, there is shown an apparatus 5 used in coating continuous tire cord fabric 6 with any suitable latex base liquid adhesive 7 for increasing the bond between the tire cord fabric 6 and rubber material used in the fabrication of pneumatic tires. The apparatus 5 essentially comprises a dip tank 8 for holding liquid adhesive 7, a cylindrical drum 9 which is rotatable in the dip tank 8 and buoyant in the liquid adhesive 7, and a plurality of rollers 10, 11, and 12 for directing the tire cord fabric 6 in and out of contact with liquid adhesive 7 carried on the outer cylindrical surface 13 of the drum 9 as it rotates in the liquid adhesive 7.

The dip tank 8 is composed of any suitable metal forming a trough having a generally U-shaped cross-section (FIG. 1). The dip tank 8 is supported on a pair of legs 14 and 15 adjacent each of the opposing ends 16 and 17 of the dip tank 8. The individual legs 14 and 15 are each mounted on a wheel or caster 18 for making the dip tank 8 portable. A pair of parallel channels 19 and 20 are secured to a factory floor 21 at right angles to the direction of movement of the tire cord fabric 6, for receiving the casters 18 and guiding the dip tank 8 into position in line with the moving fabric 6. From the dip tank 8, the wet fabric travels through an adjacent oven where it is dried and treated further by tensioning under predetermined temperatures to produce a highly stabilized tire cord fabric suitable for use in building tires.

The drum 9, when not held in position by the two farthest spaced rollers 10 and 12, floats freely in the liquid adhesive 7 in the dip tank 8. The drum 9 is adequately weighted and sized such that it is buoyant in the liquid adhesive 7 and floats at least partially submerged in the liquid adhesive 7. The drum 9 is preferably hollow and sealed, and unrestrained along its longitudinal axis, i.e., the drum 9 is not mounted on a shaft which, in turn, is rotatable in a fixed mounting like other drums used in prior art patents for applying liquid material to a fabric. Moreover, there are no bearings in which the shaft or drum 9 rotates. Thus, there are no restraints placed on the drum 9, at least along its longitudinal axis and no bearings which are susceptible to damage by the liquid adhesive 7.

However, the two farthest spaced rollers 10 and 12 act externally against the drum 9 and maintain the drum 9 in at least partially submerged relation in the liquid adhesive 7 as the drum 9 rotates within the dip tank 8. A line L connecting the axes of the drum 9 and two spaced rollers 10 and 12, forms an inverted isosceles triangle relative to the dip tank 8. The two spaced rollers 10 and 12 are designed to counteract the buoyancy forces exerted against the drum 9 by the liquid adhesive 7 when the drum 9 displaces a certain amount of liquid adhesive 7 in the dip tank 8. Thus, the buoyancy forces of the liquid adhesive 7 and the two spaced rollers 10 and 12 coact to maintain rotation of the drum 9 about a fixed axis within the dip tank 8. The rollers 10–12 may be attached to any suitable mechanism, e.g. link arms 22, for selectively adjusting the position of the rollers 10–12 to retract the rollers 10–12 from the dip tank 8 and allow positioning of a new dip tank 8; to move the rollers 10–12 to compensate for any movement of the drum 9 caused, for example, by a decline in the level of liquid adhesive 7 in the dip tank 8, at least to the point where rotation of the drum 9 is hampered. Such a mechanism 22 may be beneficially employed only when the tire cord fabric 6 being treated, is under low tension. The mechanism 22 is deleted and the rollers 10–12 are preferably made non-displaceable and rotatable about axes which are stationary when the dipping apparatus 5 is used in the treatment of highly tensioned tire cord fabric 6. In such cases, it is much simpler rolling the dip tank 8 and drum 9 into place under the fixedly positioned rotatable rollers 10–12 and then lifting the dip tank 8 to a second position where the drum 9 engages the tire cord fabric 6 reeved on the rollers 10 and 12 and is forced into at least partially submerged relation in the liquid adhesive 7 within the dip tank 8, rather than move the rollers 10–12 because of the complex machinery required for moving and holding the rollers 10–12 in place when the tire cord fabric 6 is highly tensioned.

The third roller 11 is disposed between the two spaced rollers 10–12 and acts to maintain the tire cord fabric 6 free and clear of the rotating drum 9 intermediate the two spaced rollers 10 and 12. The outer cylindrical surface 23 of the third roller 11 is spaced from the adjacent outer cylindrical surface 13 of the drum 9, since the rotation of the third roller 11 is opposed to that of the drum 9. The tire cord fabric 6 is pulled through the dipping apparatus 5 by a conventional pull roll assembly 24 under a high tension, e.g. up to about 15,000 pounds. If it were not for the third roller 11, the highly tensioned fabric 6 would engage the drum 9 intermediate the two spaced rollers 10 and 12 and force the drum 9 further into the liquid adhesive 7 and to a point where the fabric 6 would be in straight line relation between the two spaced rollers 10 and 12 and tangential to the outer surface 13 of the drum 9. Thus, it is desirable to keep the highly tensioned fabric 6 clear of the drum 9 intermediate the two spaced rollers 10 and 12. The liquid adhesive 7 builds up in the nips 25 between the rotating drum 9 and the two spaced rollers 10 and 12. This is desirable to more effectively coat both sides of the moving tire cord fabric 6. Moreover, the use of a smaller applicator drum 9 made possible by the employment of the two spaced rollers 10 and 12, is beneficial because the outer cylindrical surface 13 of the rotating drum 9 is always kept moist or wet and prevents a buildup of dried adhesive on the outer cylindrical surface 13 of the drum 9. The outer cylindrical surface 13 of the drum 9 is preferably composed of stainless steel which also helps prevent a buildup of liquid adhesive 7 on the drum 9.

A pair of stops 26 and 27 are located at the ends 16 and 17 of the dip tank 8 for engaging adjacent ends 28 and 29 of the drum 9 to restrict movement of the drum 9 along its longitudinal axis. The stops 26 and 27 are preferably spaced about one-half inch from the adjacent ends 28 and 29 of the drum 9.

The dip tank 8 may be provided with a drain for exiting liquid adhesive 7 from the tank 8 and an intake through which liquid adhesive 7 may be pumped into the tank 8. A dip tank 8 is easily replaced by first lowering the dip tank 8 from the rollers 10–12 and then rolling the dip tank 8 out from beneath the rollers 10–12. The drum 9 remains in the dip tank 8 and, when freed from the restraining influence of the rollers 10 and 12, floats in the liquid adhesive 7 in the dip tank 8, providing a sufficient amount of liquid adhesive 7 remains in the dip tank 8. The level of the liquid adhesive 7 in a properly positioned dip tank 8 may be raised by pumping more liquid adhesive 7 into the dip tank 8, or a partially filled or near empty dip tank may be replaced by a new tank filled to the desired level with liquid adhesive 7.

Thus, there has been provided a highly improved saturator roll or applicator drum for bringing tire cord fabric into contact with liquid adhesive used to coat the fabric and increase the bond between the fabric and rubber material used in the production of tires. The applicator drum is designed to float freely in the liquid adhesive and does not utilize bearings which may be ruined by the adhesive and need replacing which is costly and time consuming. The two spaced rollers restrict flotation of the applicator drum in the liquid adhesive and coact with the buoyancy forces to restrain rotation of the applicator drum about a fixed axis assuming, of course, that the level of liquid adhesive in the dip tank is kept practically constant.

What is claimed is:

1. An apparatus used for dipping a continuous length element in a liquid for coating the element, comprising in combination:
   a. a dip tank containing a coating liquid;
   b. a cylindrical drum disposed in the tank and floatable in the coating liquid;
   c. a pair of parallel rollers disposed adjacent the drum and spaced apart a distance less than the diameter of the drum for directing a continuous length element into contact with the drum and coating liquid carried from the dip tank by the drum as the drum rotates in the coating liquid; and
   d. means for positioning the rollers to restrain flotation of the drum in the coating liquid and maintain the drum parallel to the rollers as the drum and rollers rotate, the rollers and coating liquid being the only restraints against the drum in radial directions relative to the longitudinal axis of the drum.

2. The apparatus of claim 1, which includes:
   e. means disposed between the rollers for engaging the continuous length element, reeved on the rollers, and holding the element clear of the drum between the rollers.

3. The apparatus of claim 2, which includes means for causing relative movement between the drum and rollers, whereby the drum is positioned for restrictive flotation by the rollers.

4. The apparatus of claim 2, which includes:
   f. means for restricting movement of the drum along its longitudinal axis as the drum rotates in the coating liquid.

5. The apparatus of claim 4, wherein the drum restricting means (f) includes a pair of stops carried by the tank and closely spaced from opposing ends of the drum.

6. The apparatus of claim 4, wherein the element engaging means (e) includes a third roller which is free of the drum and mounted for rotation about its longitudinal axis which is parallel to the longitudinal axes of the other rollers.

7. The apparatus of claim 6, which includes means for pulling a continuous length element around the rollers in contact with the drum.

8. The apparatus of claim 7, wherein the drum surface is composed of stainless steel and the drum is in the coating liquid below the rotational axis of the drum.

* * * * *